United States Patent [19]

Aiba et al.

[11] Patent Number: 4,476,472

[45] Date of Patent: Oct. 9, 1984

[54] BUBBLE REMOVAL IN AN INK LIQUID SUPPLY SYSTEM OF AN INK JET SYSTEM PRINTER

[75] Inventors: Masahiko Aiba, Nara; Naohiro Oku, Osaka, both of Japan

[73] Assignee: Sharp Kabushiki Kaisha, Osaka, Japan

[21] Appl. No.: 512,639

[22] Filed: Jul. 11, 1983

[30] Foreign Application Priority Data

Jul. 31, 1982 [JP] Japan ............................... 57-134010

[51] Int. Cl.³ ............................................ G01D 15/18

[52] U.S. Cl. .................................. 346/75; 346/140 R

[58] Field of Search .............................. 346/75, 140 IJ

[56] References Cited

U.S. PATENT DOCUMENTS 4,163,602 4/1981 Matsumoto et al. ........... 346/140 IJ 4,357,617 11/1982 Shimazuma et al. ........... 346/140 IJ 4,403,229 9/1983 Barteck ................................ 346/75

*Primary Examiner*—J. V. Truhe

*Assistant Examiner*—A. Evans

*Attorney, Agent, or Firm*—Birch, Stewart, Kolasch & Birch

[57] ABSTRACT

A combined ink cartridge/bubble removing device is detachably secured to an ink liquid supply system for an ink jet system printer of the charge amplitude controlling type. The combined ink cartridge/bubble removing device includes a housing having a bottom wall provided with an ink inlet portion and an ink outlet portion. An ink liquid tray is disposed in the housing near the middle height of the housing. The ink liquid tray has an inlet opening which is connected to the ink inlet portion via a vertically disposed pipe, and an outlet small opening for dropping ink liquid within the housing. Ink liquid collected by a beam gutter is introduced into the combined ink cartridge/bubble removing device through the ink inlet portion. While the ink liquid travels upward in the vertically disposed pipe, bubbles included in the ink liquid are removed, and the bubbles are discharged from the free surface of the ink liquid held on the ink liquid tray.

5 Claims, 3 Drawing Figures

BUBBLE REMOVAL IN AN INK LIQUID SUPPLY SYSTEM OF AN INK JET SYSTEM PRINTER

BACKGROUND AND SUMMARY OF THE INVENTION

The present invention relates to an ink liquid supply system in an ink jet system printer of the charge amplitude controlling type.

The present invention relates, more particularly, to a bubble removing device included in an ink liquid supply system of an ink jet system printer of the charge amplitude controlling type.

Generally, in an ink jet system printer of the charge amplitude controlling type, ink droplets are emitted from a nozzle at a given frequency. Ink droplets not contributing to the actual printing operation are directed to a beam gutter for recirculation purposes. The collected ink liquid unavoidably includes bubbles.

In the conventional ink liquid supply system, a mesh filter is provided for removing the bubbles contained in the ink liquid. However, the conventional bubble removing mesh filter does not produce a satisfying result, and the mesh filter makes the ink liquid supply system undesirably large.

Accordingly, an object of the present invention is to provide a novel bubble removing device in an ink liquid supply system of an ink jet system printer of the charge amplitude controlling type.

Another object of the present invention is to provide a compact size bubble removing device in an ink liquid supply system of an ink jet system printer of the charge amplitude controlling type.

Other objects and further scope of applicability of the present invention will become apparent from the detailed description given hereinafter. It should be understood, however, that the detailed description and specific examples, while indicating preferred embodiments of the invention, are given by way of illustration only, since various changes and modifications within the spirit and scope of the invention will become apparent to those skilled in the art from this detailed description.

To achieve the above objects, pursuant to an embodiment of the present invention, an ink cartridge is removably secured to an ink liquid supply system in an ink jet system printer of the charge amplitude controlling type. The ink cartridge includes an outlet passage communicated to a subtank included in the ink liquid supply system, and an inlet passage connected to a beam gutter via a suction pump for introducing the ink liquid collected by the beam gutter.

An ink liquid tray is disposed in the ink cartridge. The ink liquid tray has a bottom plate which is provided with an inlet opening formed through the bottom plate and an outlet small opening formed through the bottom plate. The inlet opening is connected to the inlet passage of the ink cartridge through an ink inlet pipe. As the ink liquid travels upward in the ink inlet pipe, bubbles included in the ink liquid are removed. The removed bubbles are discharged through the free surface of the ink liquid held on the ink liquid tray. The ink liquid, from which the bubbles have been removed, drops through the outlet small opening, and is stored in the ink liquid cartridge.

BRIEF DESCRIPTION OF THE DRAWINGS

The present invention will be better understood from the detailed description given hereinbelow and the accompanying drawings which are given by way of illustration only, and thus are not limitative of the present invention and wherein.

DESCRIPTION OF THE PREFERRED EMBODIMENTS

Figure 1:
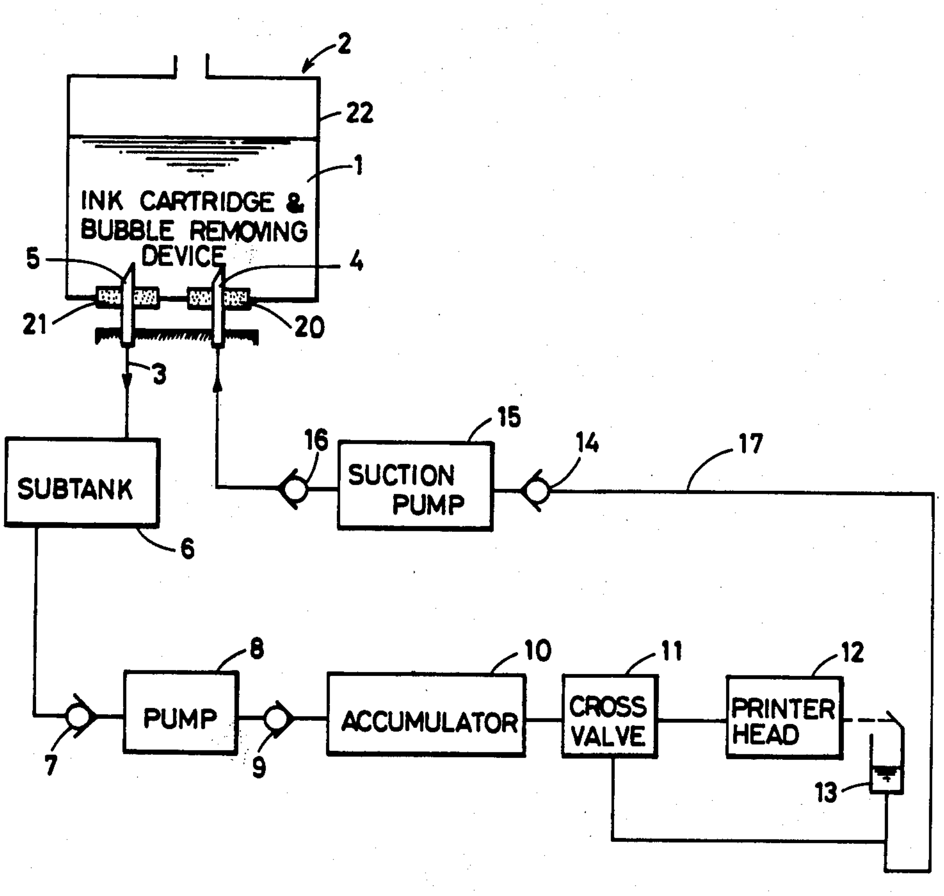
FIG. 1 is a block diagram of an ink liquid supply system in an ink jet system printer of the charge amplitude controlling type, including an embodiment of a bubble removing device of the present invention.

An ink liquid supply system for an ink jet system printer of the charge amplitude controlling type includes a combined ink cartridge/bubble removing device 2 removably secured to the ink liquid supply system. More specifically, the ink liquid supply system includes an ink outlet needle 5 for discharging ink liquid 1 from the combined ink cartridge/bubble removing device 2 to an ink supply conduit 3, and an ink inlet needle 4 for introducing the ink liquid into the combined ink cartridge/bubble removing device 2. The ink outlet needle 5 and the ink inlet needle 4 are inserted into an ink outlet rubber seal 21 and an ink inlet rubber seal 20, respectively, provided in a housing 22 of the combined ink cartridge/bubble removing device 2 when the combined ink cartridge/bubble removing device 2 is secured to the ink liquid supply system.

The ink liquid discharged from the combined ink cartridge/bubble removing device 2 is introduced into a subtank 6 via the ink outlet needle 5 and the ink supply conduit 3. A constant flow rate pump system 8 is connected to pump the ink liquid from the subtank 6 via an ink inlet valve 7. The constant flow rate pump system 8 channels the ink liquid at a constant flow rate toward an accumulator 10 through an ink outlet valve 9. The accumulator 10 functions to stabilize the static pressure of the ink liquid developed from the constant flow rate pump system 8.

The thus stabilized ink liquid is supplied from the accumulator 10 to a printer head 12 via an electromagnetic cross valve 11. As is well known in the art, the printer head 12 includes a nozzle to which an electromechanical transducer (piezo vibrator) is attached in order to emit ink droplets at a given frequency. The printer head 12 further includes a charging tunnel for charging the ink droplets in accordance with a print information signal. The charged ink droplets are deflected while they pass between a pair of deflection electrodes which are also included in the printer head 12. The ink droplets not contributing to the actual printing operation are not charged nor deflected, and are directed to a beam gutter 13. The ink liquid collected by the beam gutter 13 is returned to the combined ink cartridge/bubble removing device 2 via a returning conduit 17.

When the printing operation is terminated, the constant flow rate pump system 8 is disabled, and the electromagnetic cross valve 11 is switched to connect the printer head 12 to the return conduit 17. The ink liquid disposed between the electromagnetic cross valve 11 and the printer head 12 is forced to flow into the return conduit 17 due to the negative pressure created in the return conduit 17. That is, when the printing operation is not conducted, the ink liquid does not remain in the nozzle portion of the printer head 12.

The ink liquid introduced into the return conduit 17 is returned to the combined ink cartridge/bubble removing device 2 through the ink inlet needle 4 by means of a suction pump 15. Valves 14 and 16 are associated with the suction pump 15. The ink liquid collected by the beam gutter 13 unavoidably includes bubbles. The combined ink cartridge/bubble removing device 2 of the present invention includes a device for removing bubbles from the ink liquid returned to the combined ink cartridge/bubble removing device 2.

Figure 2:
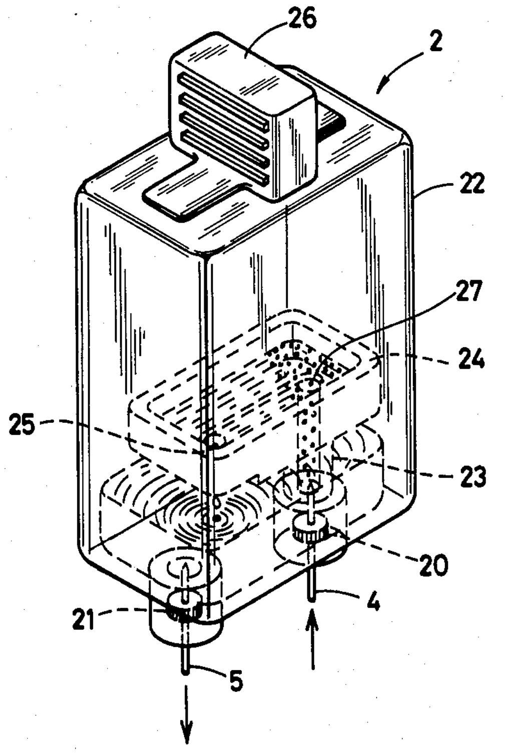
FIG. 2 is a perspective view of the embodiment of the bubble removing device of the present invention.

FIG. 2 shows an embodiment of a combined ink cartridge/bubble removing device 2 of the present invention. As already discussed above, the bottom wall of the housing 22 is provided with the ink inlet rubber seal 20 and the ink outlet rubber seal 21. The ink inlet needle 4 and the ink outlet needle 5 included in the ink liquid supply system are inserted through the ink inlet rubber seal 20 and the ink outlet rubber seal 21, respectively, to set the combined ink cartridge/bubble removing device 2 onto the ink liquid supply system.

Figure 3:
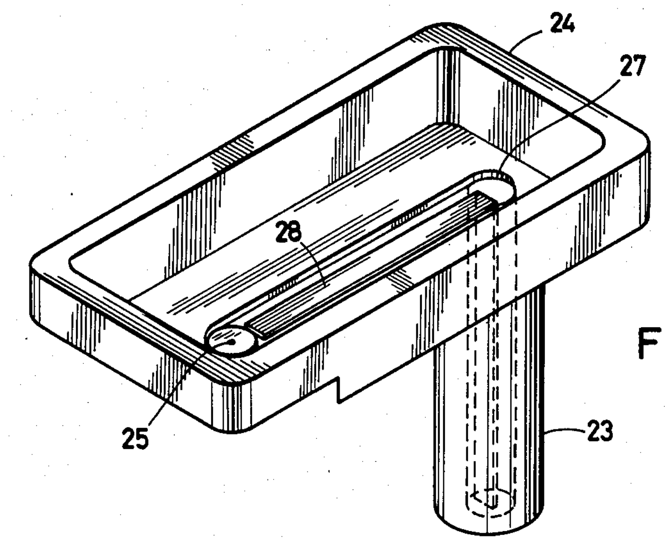
FIG. 3 is a perspective view of an ink liquid tray included in the bubble removing device of FIG. 2.

The combined ink cartridge/bubble removing device 2 includes an ink liquid tray 24 disposed in the middle height of the housing 22. FIG. 3 shows the ink liquid tray 24. The ink liquid tray 24 is provided with an opening 27 to introduce the ink liquid on the ink liquid tray 24, and an small opening 25 having a diameter of about 1 to 2 mm. The opening 27 is communicated to the ink inlet portion, including the ink inlet needle 4 and the ink inlet rubber seal 20, via an ink inlet pipe 23. More specifically, the bottom end of the ink inlet pipe 23 is secured to the ink inlet rubber seal 20 so as to surround the ink inlet needle 4, and the upper end of the ink inlet pipe 23 is secured to the under surface of the ink liquid tray 24 so as to communicate with the opening 27. The ink inlet pipe 23 is vertically disposed in the housing 22. The top wall of the housing 22 is provided with a cap 26 for discharging the air from the combined ink cartridge/bubble removing device 2.

The ink liquid collected by the beam gutter 13 is returned to the combined ink cartridge/bubble removing device 2 through the returning conduit 17 and the suction pump 15. The thus returned ink liquid is fed to the ink inlet pipe 23 via the ink inlet needle 4. The bubbles included in the returned ink liquid receive an ascending force while the ink liquid travels in the ink inlet pipe 23. Therefore, the bubbles are discharged from the free surface of the ink liquid held on the ink liquid tray 24, and, then, discharged through the cap 26. The ink liquid held on the ink liquid tray 24 drops through the small opening 25, and the ink liquid is stored in the lower section of the combined ink cartridge/bubble removing device 2. Since the small opening 25 has a short diameter of about 1 to 2 mm, the bubbles are completely removed from the ink liquid when the ink liquid drops through the small opening 25. The thus reservoired ink liquid disposed in the combined ink cartridge/bubble removing device 2 is supplied to the subtank 6 via the ink outlet needle 5 which is inserted through the ink outlet rubber seal 21.

Although in the foregoing embodiment the ink liquid tray 24 has the free upper surface, the ink liquid tray 24 can be replaced by a housing which has an aperture for discharging the air removed from the ink liquid.

In a preferred form, a conducting plate 28 is disposed in the ink inlet pipe 23. The conducting plate 28 is bended at the opening 27, and is extended along the inner surface of the ink liquid tray 24 to reach near the small opening 25. In such a system, when an ink sensing signal is applied to the ink inlet needle 4, a detection signal is obtained at the ink outlet needle 5 due to the conductivity of the ink liquid, if a sufficient amount of ink liquid is reservoired in the combined ink cartridge/bubble removing device. If the ink level is lower than the height of the small opening 25 as shown in FIG. 2, the detection signal is not obtained at the ink outlet needle 5. Such a detection signal can be used to inform the operator of the necessity for exchanging the combined ink cartridge/bubble removing device 2 with a new one containing sufficient ink liquid.

The invention being thus described, it will be obvious that the same may be varied in many ways. Such variations are not to be regarded as a departure from the spirit and scope of the invention, and all such modifications are intended to be included within the scope of the following claims.

What is claimed is:

1. An ink liquid supply system for an ink jet system printer of the charge amplitude controlling type comprising:

an ink liquid reservoir for containing ink liquid therein;

a supply pump means for supplying the ink liquid from said ink liquid reservoir to a printer head;

a beam gutter for collecting ink droplets emitted from said printer head but not contributing to the actual printing operation; and a combined ink cartridge/bubble removing device connected to receive ink liquid from said beam gutter and to channel ink liquid to said ink liquid reservoir, said combined ink cartridge/bubble removing device including:

a housing having a bottom wall which is provided with an ink inlet portion communicated to said beam gutter for introducing the ink liquid from said beam gutter into the combined ink cartridge/bubble removing device, and an ink outlet portion communicated to said ink liquid reservoir for supplying the ink liquid from the combined ink cartridge/bubble removing device to said ink liquid reservoir;

tray means disposed in said housing near the middle height in said housing, said tray means having a bottom wall which is provided with a first opening for introducing the ink liquid onto the tray means, and a second small opening for dropping the ink liquid from said tray means within said housing; and an ink inlet pipe disposed between said first opening formed in said bottom wall of said tray means and said ink inlet portion formed in said bottom wall of said housing, said ink inlet pipe being substantially vertically disposed in said housing.

2. The ink liquid supply system of claim 1, further comprising:

an ink liquid inlet needle for introducing the ink liquid into said combined ink cartridge/bubble removing device; and an ink liquid outlet needle for developing the ink liquid from said combined ink cartridge/bubble removing device, wherein:

said ink inlet portion of said housing includes an ink inlet rubber seal for accommodating said ink liquid inlet needle therethrough; and said ink outlet portion of said housing includes an ink outlet rubber seal for accommodating said ink liquid outlet needle therethrough, whereby said combined ink cartridge/bubble removing device is removably secured to the ink liquid supply system.

3. The ink liquid supply system of claim 2, further comprising a suction pump disposed between said beam gutter and said combined ink cartridge/bubble removing device for returning ink liquid from said beam gutter to said ink liquid inlet needle.

4. The ink liquid supply system of claim 1, wherein said housing has a cap for discharging air from said combined ink cartridge/bubble removing device.

5. The ink liquid supply system of claim 1, said combined ink cartridge/bubble removing device further including a conductive plate disposed in said ink inlet pipe, said conductive plate being extended on said tray means to near said second small opening formed in said bottom wall of said tray means.

* * * * *